(12) United States Patent
Mchugh et al.

(10) Patent No.: US 12,077,069 B2
(45) Date of Patent: Sep. 3, 2024

(54) CHILD RESTRAINT

(71) Applicant: Dorel Juvenile Group, Inc., Foxboro, MA (US)

(72) Inventors: William P. Mchugh, Norfolk, MA (US); Jason H. Johnson, Brownstown, IN (US); Grant M. Mason, Wrentham, MA (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 0 days.

(21) Appl. No.: 17/882,031

(22) Filed: Aug. 5, 2022

(65) Prior Publication Data

US 2023/0045540 A1 Feb. 9, 2023

Related U.S. Application Data

(60) Provisional application No. 63/230,192, filed on Aug. 6, 2021.

(51) Int. Cl.
  B60N 2/28 (2006.01)
(52) U.S. Cl.
  CPC ......... B60N 2/2821 (2013.01); B60N 2/2869 (2013.01)
(58) Field of Classification Search
  CPC .............................. B60N 2/2821; B60N 2/2869
  See application file for complete search history.

(56) References Cited

U.S. PATENT DOCUMENTS

| 6,260,920 | B1 * | 7/2001 | Tolfsen | B60N 2/143 |
| | | | | 297/256.16 |
| 6,318,807 | B1 | 11/2001 | Perego | |
| 7,338,122 | B2 | 3/2008 | Hei | |
| 7,559,606 | B2 | 7/2009 | Hei | |
| 7,575,276 | B1 | 8/2009 | Henry | |
| 7,735,921 | B2 | 6/2010 | Hutchinson | |
| 7,770,970 | B2 | 8/2010 | Hei | |
| 7,828,381 | B2 | 11/2010 | Barger | |
| 7,887,129 | B2 | 2/2011 | Hei | |
| 8,235,465 | B2 | 8/2012 | Hei | |
| 8,256,841 | B2 | 9/2012 | Hei | |
| 8,317,265 | B2 | 11/2012 | Hutchinson | |
| 8,474,907 | B2 | 7/2013 | Weber | |
| 8,511,749 | B2 | 8/2013 | Hei | |
| 9,090,182 | B2 | 7/2015 | Rabeony | |
| 9,487,111 | B2 | 11/2016 | Lake | |
| 10,457,168 | B2 | 10/2019 | Anderson | |
| 10,464,451 | B2 | 11/2019 | Stamper | |
| 10,583,756 | B2 | 3/2020 | Anderson | |
| 10,688,892 | B2 | 6/2020 | Anderson | |
| 10,710,478 | B2 | 7/2020 | Reaves | |
| 11,420,540 | B2 | 8/2022 | Williams | |
| 11,427,114 | B2 | 8/2022 | Keegan | |

(Continued)

OTHER PUBLICATIONS

Office Action (Non-Final Rejection) dated Jun. 20, 2024 for U.S. Appl. No. 17/880,036, CO-1271 US-U II (pp. 1-11).

*Primary Examiner* — David R Dunn
*Assistant Examiner* — Tania Abraham
(74) *Attorney, Agent, or Firm* — Barnes & Thornburg LLP

(57) ABSTRACT

A child restraint includes a seat base adapted to rest on a vehicle seat and a juvenile seat coupled to the seat base. The child restraint further includes a juvenile-seat release system configured to mount the juvenile seat to the seat base and allow separation of the juvenile seat from the seat base.

17 Claims, 7 Drawing Sheets

(56) References Cited

U.S. PATENT DOCUMENTS

| | | |
|---|---|---|
| 11,565,612 B2 | 1/2023 | Williams |
| 2008/0224516 A1 | 9/2008 | Vegt |
| 2016/0176320 A1 | 6/2016 | Williams |
| 2019/0077282 A1 | 3/2019 | Reaves |
| 2019/0135142 A1* | 5/2019 | Jung .................... B60N 2/2821 |
| 2021/0237626 A1 | 8/2021 | Longenecker |
| 2022/0048415 A1 | 2/2022 | Keegan |
| 2022/0212575 A1 | 7/2022 | Williams |
| 2022/0219581 A1 | 7/2022 | Brunick |
| 2022/0242288 A1 | 8/2022 | Po-Jung |
| 2022/0355713 A1 | 11/2022 | Longenecker |
| 2023/0256875 A1 | 8/2023 | Zhang |

\* cited by examiner

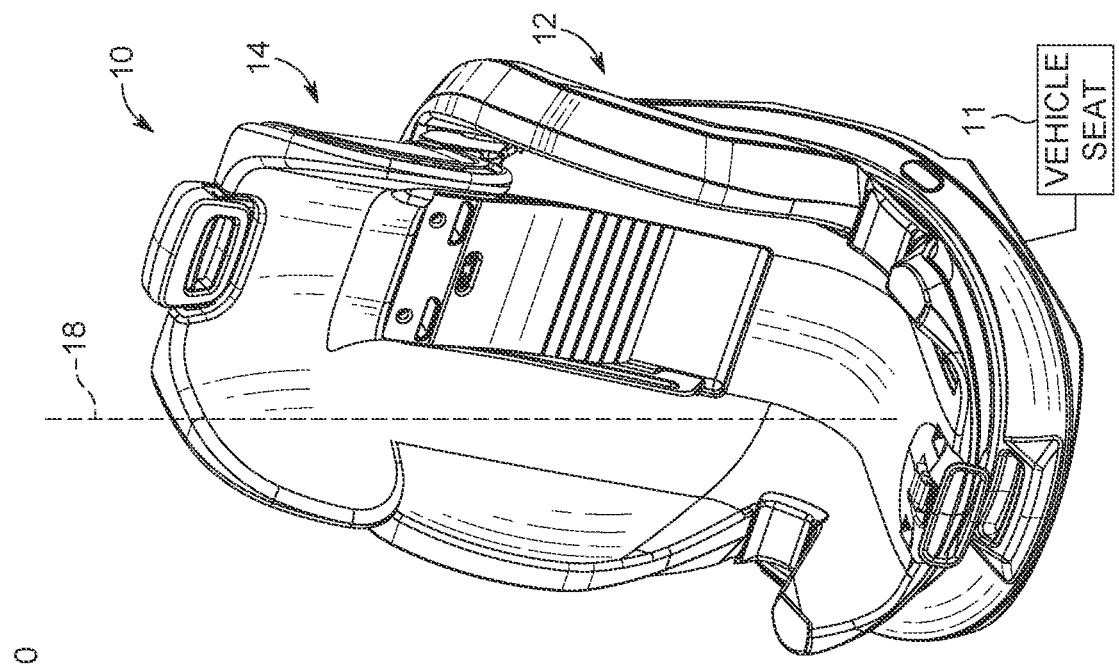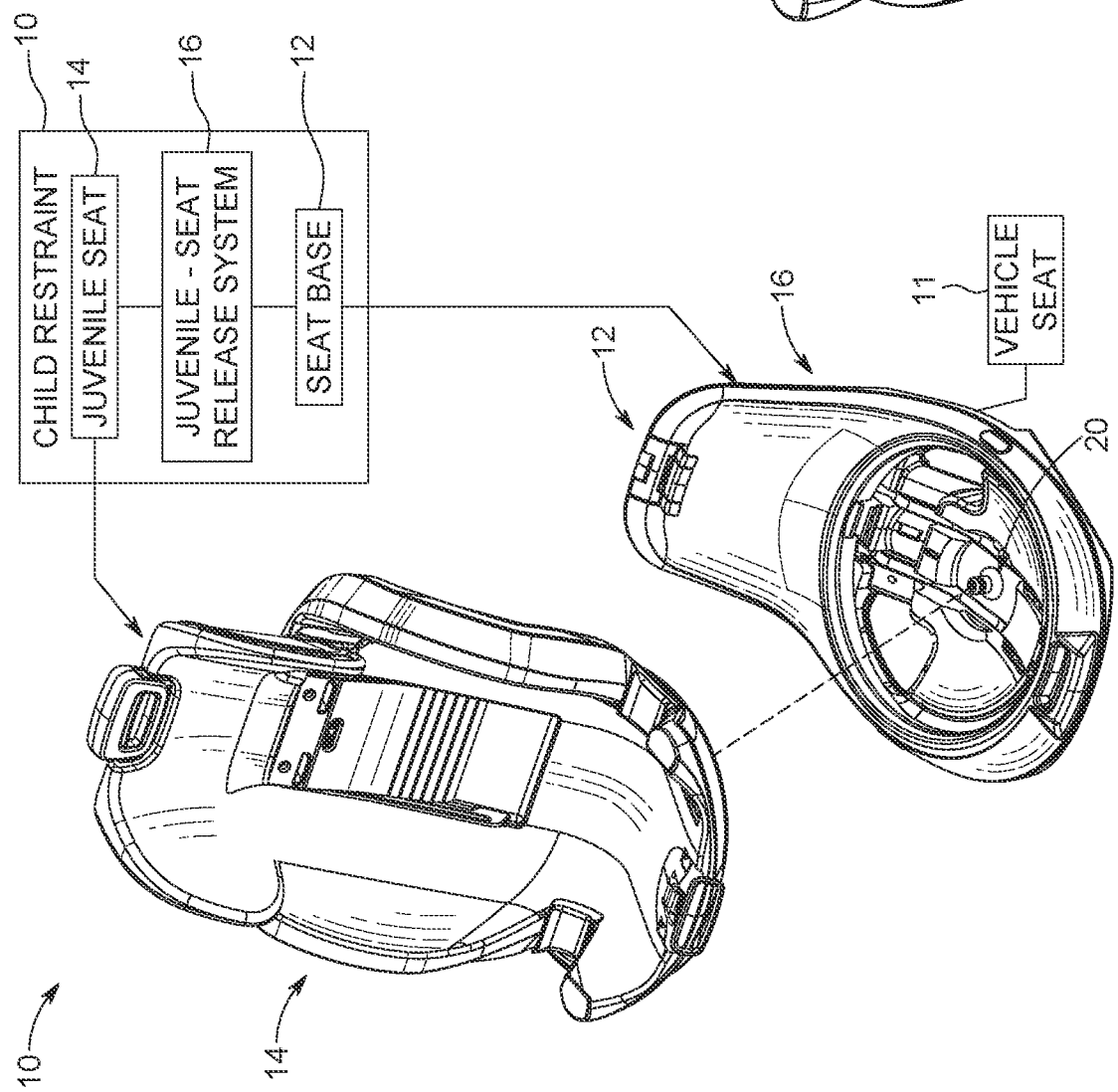
FIG. 1
FIG. 2

CHILD RESTRAINT

PRIORITY CLAIM

This application claims priority under 35 U.S.C. § 119(e) to U.S. Provisional Application Ser. No. 63/230,192, filed Aug. 6, 2021, which is expressly incorporated by reference herein.

BACKGROUND

The present disclosure relates to a child restraint, and particularly to a child restraint including a seat base and a juvenile seat coupled to the seat base. More particularly, the present disclosure relates to a child restraint that includes a seat base and a removable juvenile seat.

SUMMARY

According to the present disclosure, a child restraint includes a seat base adapted to rest on and secure to a vehicle seat and a juvenile seat configured to mount removably to the seat base. The seat base and the juvenile seat cooperate to secure a child to the vehicle seat for transportation in a vehicle.

In illustrative embodiments, the child restraint further includes a juvenile-seat release system configured to mount the juvenile seat to the seat base and allow separation of the juvenile seat from the seat base. The juvenile-seat release system includes an attachment post coupled to the seat base, a juvenile-seat retainer latch coupled to the juvenile seat, and a release actuator coupled to the juvenile-seat retainer latch. The attachment post is arranged to extend upwardly in a vertical direction away from the seat base. The juvenile-seat retainer latch is configured to engage the attachment post to retain the juvenile seat to the seat base in an installed position. The release actuator is configured to be actuated by a user to change the juvenile-seat retainer latch from a locked position, in which the juvenile-seat retainer latch engages the attachment post, and a freed position, in which the juvenile-seat retainer latch is disengaged from the attachment post to allow separation of the juvenile seat from the seat base.

In illustrative embodiments, the child restraint is rotatable about a vertical rotation axis from a sideways, release orientation to forward and rearward-facing, travel orientations. The child restraint may further include a juvenile-seat retainer system to retain the juvenile seat to the seat base in the forward and rearward-facing travel orientations. The juvenile-seat retainer system includes a seat-base retainer fixed to the seat base and a first juvenile-seat retainer fixed to the juvenile seat, and a second juvenile-seat retainer fixed to the juvenile seat. The first and second juvenile-seat retainers are spaced apart from the juvenile-seat retainer latch to locate the juvenile-seat retainer latch between the first and second juvenile-seat retainers. The first juvenile-seat retainer is configured to interlock with the seat-base retainer to block removal of the juvenile seat from the seat base when the juvenile seat is in the forward-facing orientation. The second juvenile-seat retainer is configured to interlock with the seat-base retainer to block removal of the juvenile seat from the seat base when the juvenile seat is in the rearward-facing orientation.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective view of a child restraint in accordance with the present disclosure showing the child restraint includes a seat base adapted to rest on and secure to a vehicle seat and a juvenile seat configured to mount to the seat base as shown in FIG. 2 and showing that the seat base includes a juvenile-seat release system that is configured to allow separation of the juvenile seat from the seat base;

FIG. 2 is a perspective view of the child restraint showing the juvenile seat mounted on the seat base and arranged to lie in a forward-facing orientation relative to the seat base;

FIG. 3 is a perspective view of the child restraint showing the juvenile seat removed from the seat base and rotated to show a bottom end of the juvenile seat and showing that the juvenile-seat release system includes an attachment post coupled to the seat base, a juvenile-seat retainer latch coupled to the juvenile seat and configured to engage with the attachment post when the juvenile seat is mounted on the seat base, a release actuator coupled to the juvenile seat and configured to move the juvenile-seat retainer latch out of engagement with the attachment post so that the juvenile seat is free to be separated from the seat base, and showing that the child restraint further includes a juvenile-seat retainer system having a seat-base retainer and first and second juvenile-seat retainers which interlock with the seat-base retainer in the forward and rearward-facing orientations to block separation of the juvenile seat from the seat base;

Figure 3:
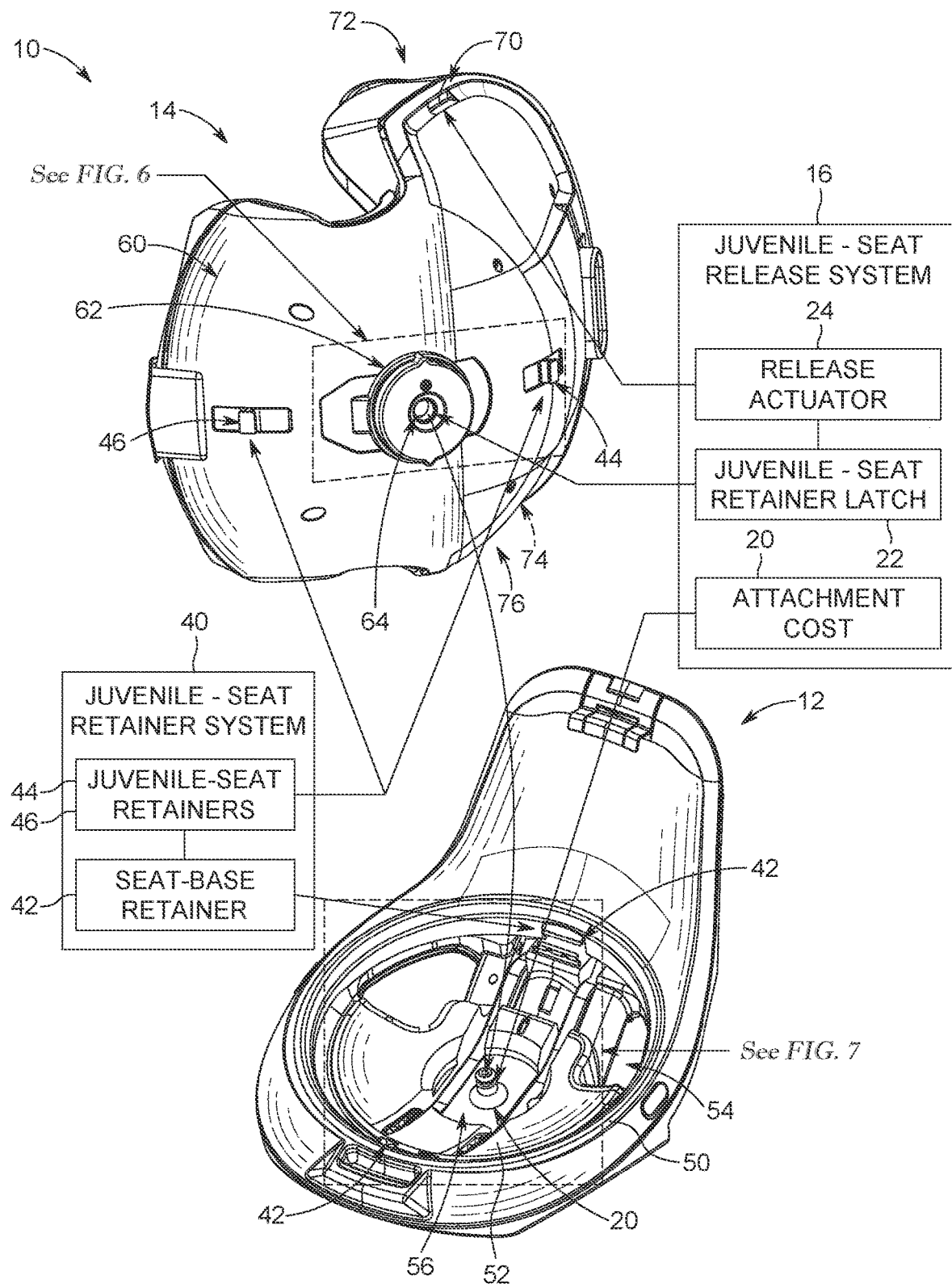
Figure 4:
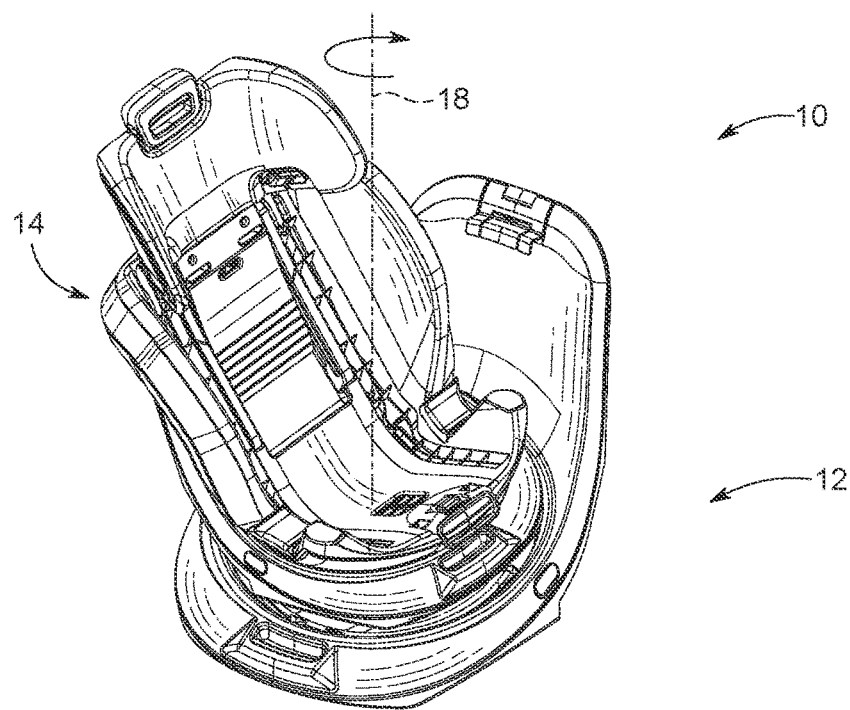
FIG. 4 is a perspective view of the child restraint showing the juvenile seat rotated about a vertical rotation axis defined by the attachment post to a sideways, release orientation relative to the seat base where the juvenile seat is installable and separable from the seat base.
Figure 5:
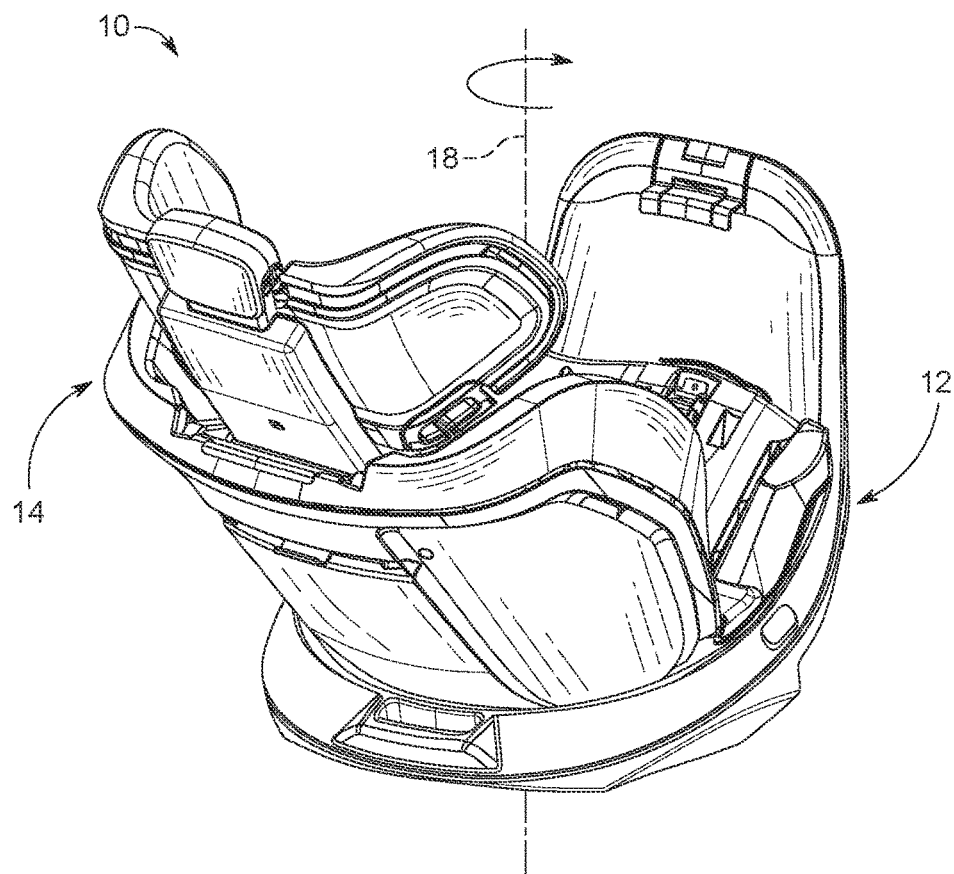
FIG. 5 is a perspective view of the child restraint showing the juvenile seat rotated about the vertical rotation axis to a rearward-facing orientation relative to the seat base.
Figure 6:
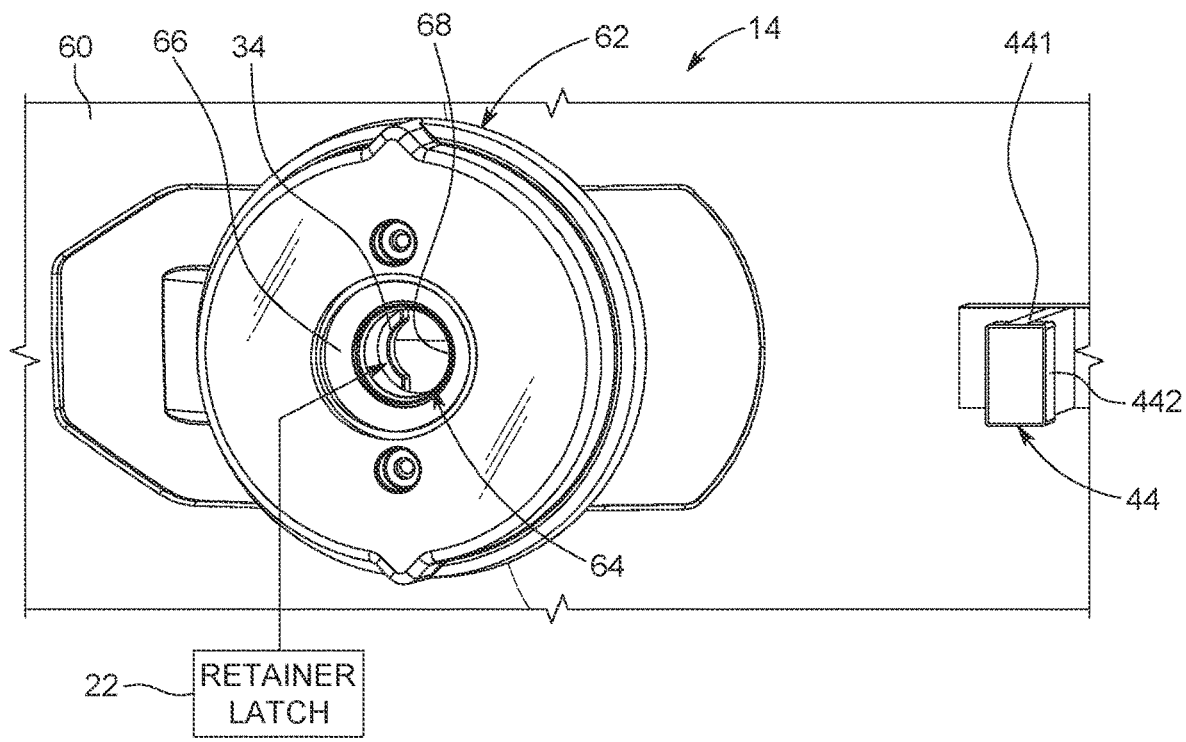
Figure 7:
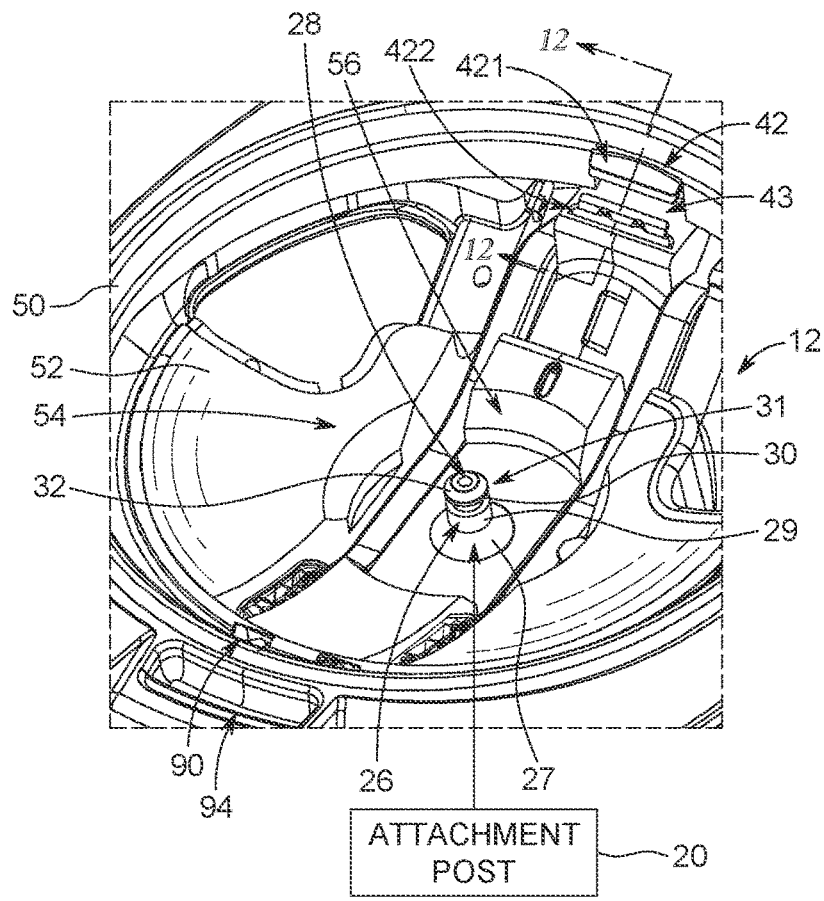
Figure 8:
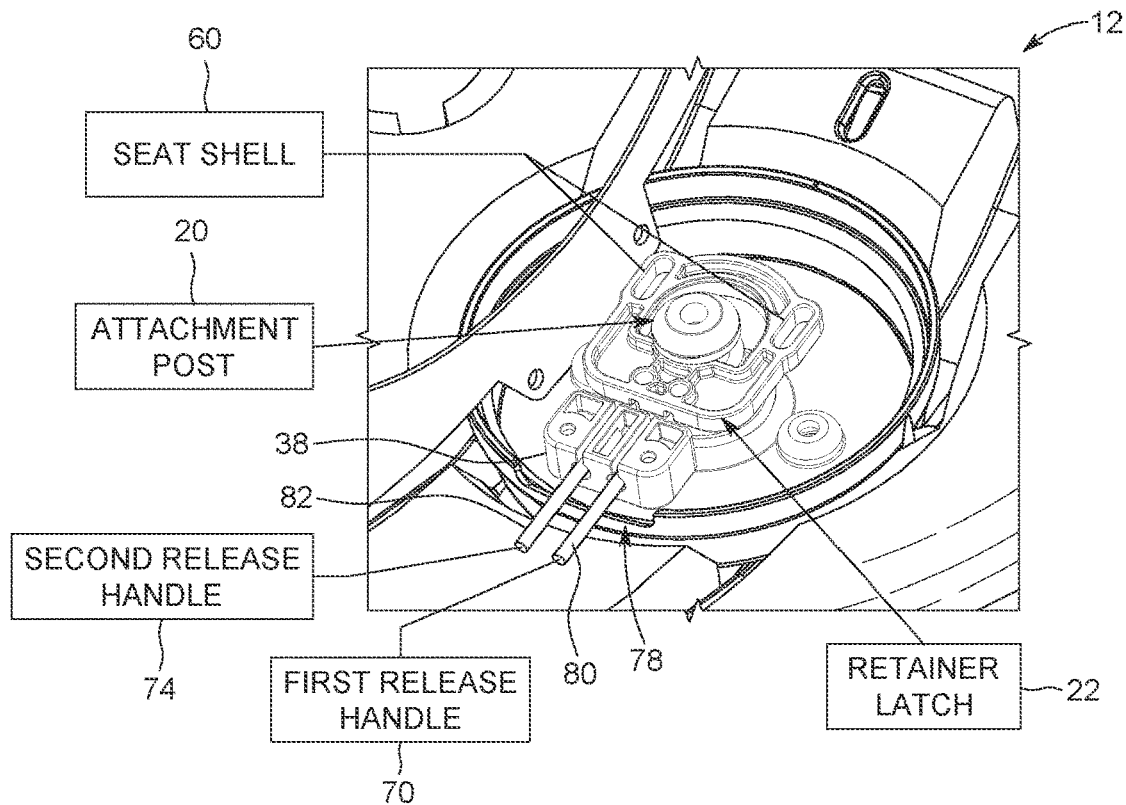
Figure 9:
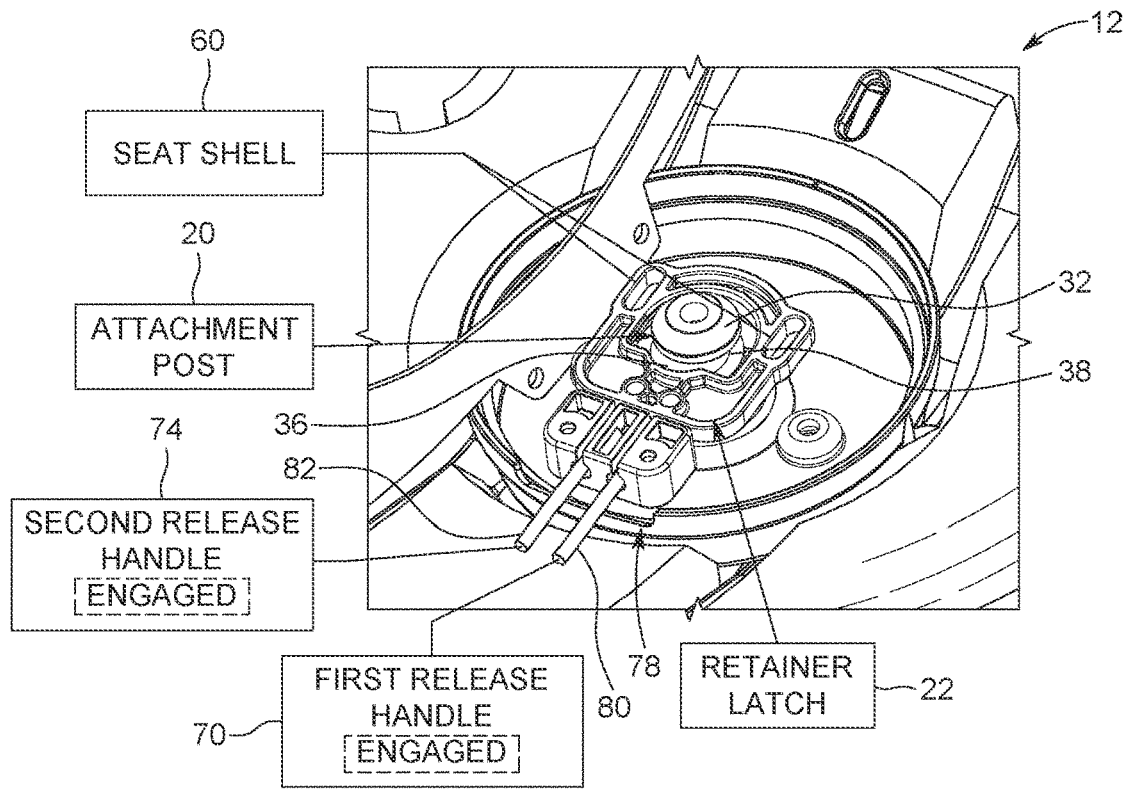
Figure 10:
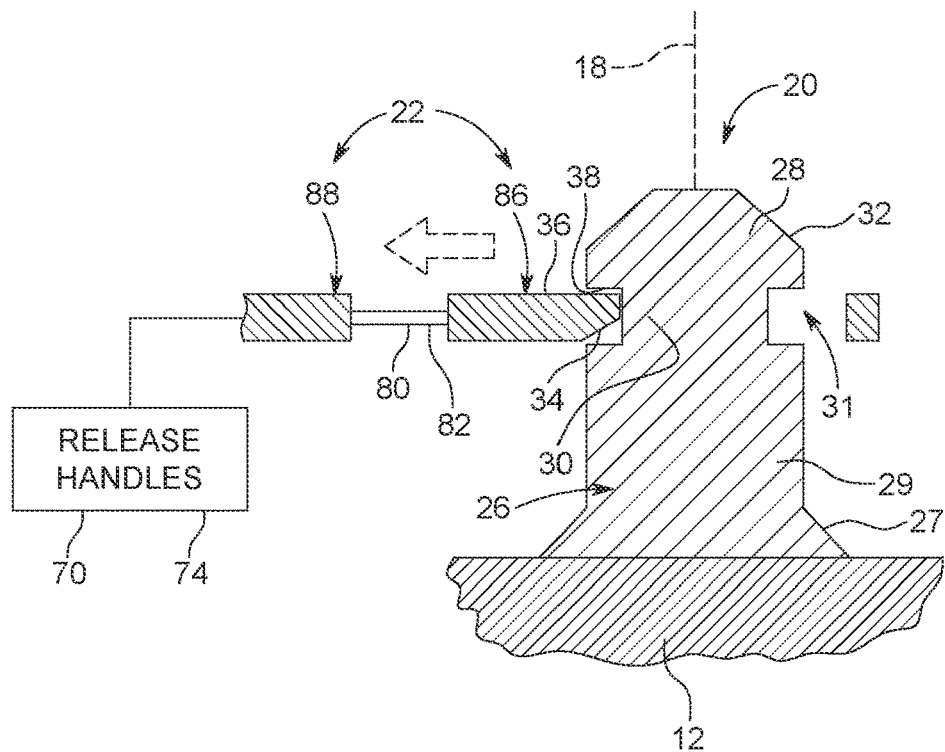
Figure 11:
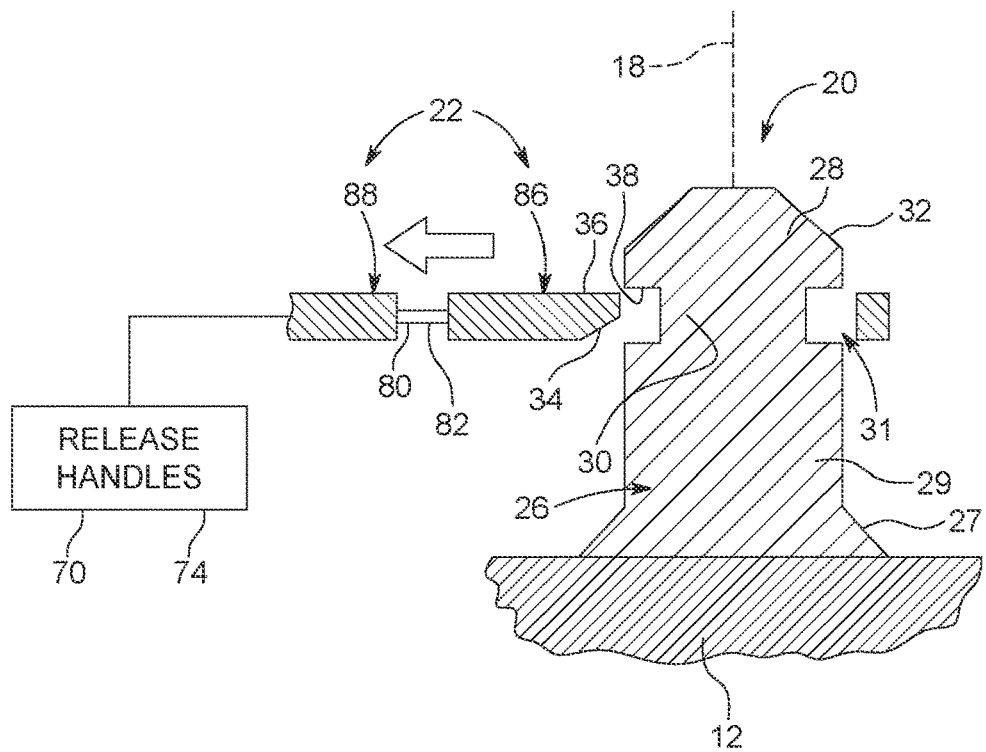
Figure 12:
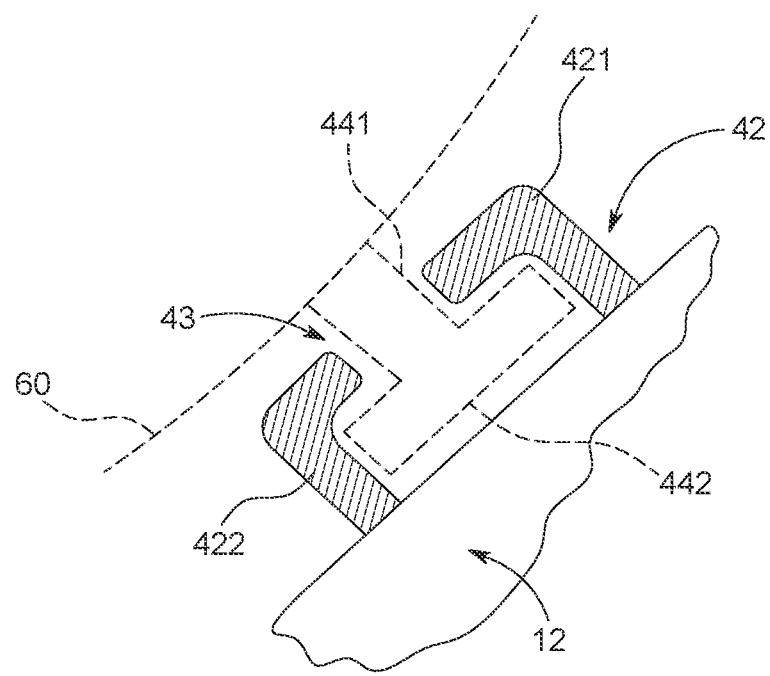
Figure 13:
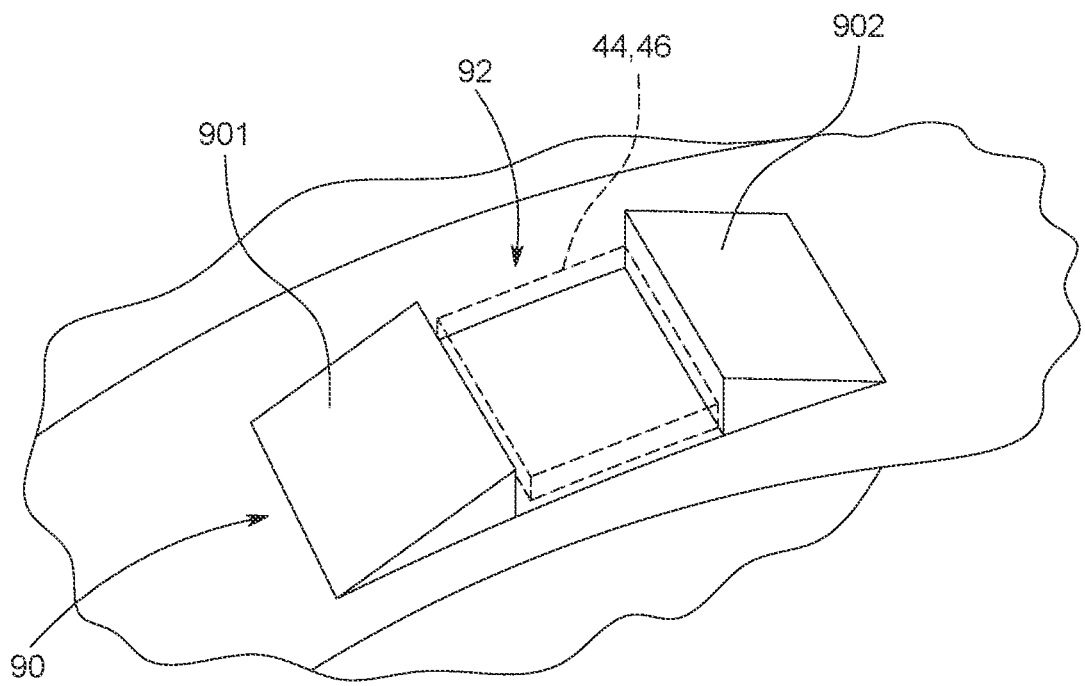

FIG. 6 is an enlarged perspective view of a portion of the juvenile seat from FIG. 3 showing that the juvenile seat includes a seat shell and a seat-shell pedestal coupled to the bottom end of the juvenile seat and showing that the seat-shell pedestal is formed to include a post-receiving space configured to receive the attachment post and showing that the juvenile-seat retainer latch extends into the post-receiving space to engage with the attachment post when the juvenile seat is installed on the seat base;

FIG. 7 is an enlarged perspective view of a portion of the seat base from FIG. 3 showing that the attachment post includes a post base coupled to the seat base, a retainer tip spaced apart from the post base, and a latch connector interconnecting the post base and the retainer tip and sized such that the attachment post is formed to include an annular latch-receiving channel which receives a portion of the retainer latch to retain the juvenile seat to the seat base;

FIG. 8 is a perspective view of a portion of the seat base and the juvenile seat with portions of the juvenile seat hidden to show the retainer latch mounted on the attachment post in a locked position in which a portion of the retainer latch is biased to extend into the annular latch-receiving channel where the retainer tip blocks separation of the juvenile seat from the seat base;

FIG. 9 is a perspective view similar to FIG. 8 showing the retainer latch moved to a freed position in which the portion of the retainer latch is removed from the annular latch-receiving channel to allow the retainer latch to move in an upward direction past the retainer tip to separate the juvenile seat from the seat base;

FIG. 10 is a sectional view of the attachment post and the latch retainer in the locked position showing the portion of the retainer latch received in the annular latch-receiving channel;

FIG. 11 is a view similar to FIG. 10 with the attachment post and the latch retainer in the freed position showing the portion of the retainer latch removed from the annular latch-receiving channel;

FIG. 12 is a sectional view of the seat-base retainer included in the juvenile-seat retainer system showing that the seat-base retainer includes an upper retainer flange and a lower retainer flange spaced apart from the upper retainer flange and showing one of the juvenile-seat retainers arranged to lie between the upper and lower retainer flanges; and FIG. 13 is a perspective view of a circumferential-motion blocker coupled to a front end of the seat base and including a first inclined ramp and a second inclined ramp spaced apart from the first inclined ramp, and showing one of the juvenile-seat retainers arranged to lie between the first and second inclined ramps to block rotation of the juvenile seat about the vertical rotation axis relative to the seat base.

DETAILED DESCRIPTION

A child restraint 10, in accordance with the present disclosure, includes a seat base 12 adapted to rest on a vehicle seat 11 and a juvenile seat 14 coupled to the seat base 12 as shown in FIGS. 1 and 2. The seat base 12 is configured to support the juvenile seat 14 in a vehicle and for transportation in the vehicle. The juvenile seat 14 is sized and shaped to secure a child for transportation in the vehicle. The juvenile seat 14 is coupled removably to the seat base 12 and further includes a juvenile-seat release system 16 configured to mount the juvenile seat 14 to the seat base 12 and allow separation of the juvenile seat 14 from the seat base 12. The juvenile seat 14 is rotatable about a vertical rotation axis 18 while being retained to the seat base 12 by the juvenile-seat release system 16.

The juvenile-seat release system 16 includes an attachment post 20 coupled to the seat base 12, a juvenile-seat retainer latch 22 coupled to the juvenile seat 14, and a release actuator 24 coupled to the juvenile-seat retainer latch 22 as shown in FIG. 3. The attachment post 20 is arranged to extend upwardly in a vertical direction away from the seat base 12. The juvenile-seat retainer latch 22 is configured to engage the attachment post 20 to retain the juvenile seat 14 to the seat base 12 in an installed position. The release actuator 24 is configured to be actuated by a user to change the juvenile-seat retainer latch 22 from a locked position, in which the juvenile-seat retainer latch 22 engages the attachment post 20, and a freed position, in which the juvenile-seat retainer latch 22 is disengaged from the attachment post 20 to allow separation of the juvenile seat 14 from the seat base 12.

The attachment post 20 is fixed to seat base 12 and includes a post base 26, a retainer tip 28 spaced apart from the post base 26, and a latch connector 30 interconnecting the post base 26 and the retainer tip 28 as shown in FIGS. 3 and 7. The post base 26 has a base dome 27 and a base shaft 29 coupled to an upper end of the base dome 27. The retainer tip 28 is configured to engage with the juvenile-seat retainer latch 22 to retain the juvenile seat 14 to the seat base 12. The latch connector 30 is sized shaped to allow connection of the juvenile-seat retainer latch 22 to the attachment post 20. In the illustrative embodiment, the attachment post 20 does not move relative to the seat base 12 and the juvenile seat 14 is rotatable about vertical rotation axis 18 relative to the attachment post 20. In some embodiments, the attachment post 20 is rotatable with the juvenile seat about the vertical rotation axis 18.

The juvenile-seat retainer latch 22 is configured to engage the attachment post 20 and to lie vertically between the post base 26 and the retainer tip 28 in the locked position. The retainer tip 28 has a downwardly-sloped upper surface 32 that engages the juvenile-seat retainer latch 22 during installation of the juvenile seat 12 on the seat base 12 to cause movement of the juvenile-seat retainer latch 22 without actuating the release actuator 24.

The juvenile-seat retainer latch 22 includes a lower, upwardly-sloped surface 34 and a vertical-motion blocking surface 36 as shown in FIGS. 6, 10, and 11. The lower, upwardly-sloped surface 34 is configured to engage the downwardly-sloped upper surface 32 of the retainer tip 28 during installation of the juvenile seat 14 on the seat base 12. The vertical-motion blocking upper surface 36 is configured to engage a downwardly-facing surface 38 of the retainer tip 28 in the locked position to block upward movement of the retainer latch 22 relative to the attachment post 20 as shown in FIG. 10.

The latch connector 30 has a smaller diameter than the post base 26 and the retainer tip 28 to provide an annular latch channel 31 below the retainer tip 28 and above the post base 28 as shown in FIGS. 6, 10, and 11. The annular latch channel 31 is configured to receive the juvenile-seat retainer latch 22 in the locked position to block separation of the juvenile seat 14 from the seat base 12. The juvenile-seat retainer latch 22 may have a thickness that is about equal to a thickness of the annular latch channel 31 to minimize clearance therebetween so that movement of the juvenile seat 14 relative to the seat base 12 is minimized when the juvenile-seat retainer latch 22 is in the locked position.

The seat base 12 includes a circular-shaped upper rim 50 and a seat-base foundation 52 that extends downwardly from the upper rim 50 and cooperates with the upper rim 50 to at least partially define a juvenile-seat receiving space 54 as shown in FIGS. 3 and 7. The attachment post 20 is fixed to the seat-base foundation 52. The upper rim 50 extends circumferentially around the attachment post 20. The juvenile-seat receiving space 54 is generally shaped as a concave bowl that corresponds to a shape of the bottom end of the juvenile seat 14 to allow rotation of the juvenile seat 14 relative to the seat base 12 about the vertical rotation axis 18.

The juvenile seat 14 includes a seat shell 60 and a seat-shell pedestal 62 coupled to a bottom of the seat shell 60 and that extends toward the seat-base foundation 52 as shown in FIGS. 3 and 6. The seat-base foundation 52 is formed to include a pedestal-receiving space 56. The seat-shell pedestal 62 is configured to extend into the pedestal-receiving space 56 when the juvenile seat 14 is installed on the seat base 12. The pedestal-receiving space 56 is generally circular and the seat-shell pedestal 62 is generally cylindrical to allow rotation of the seat-shell pedestal 62 about the vertical rotation axis 18 within the pedestal-receiving space 56.

The attachment post 20 is arranged to lie in the pedestal-receiving space 56 as shown in FIGS. 3 and 7. The seat-shell pedestal 62 is formed to include a post-receiving space 64 that receives the attachment post 20 when the juvenile seat 14 is installed on the seat base 12. The post receiving space 64 is defined at least partially by a lower cone-shaped wall 66 and an upper cylindrical wall 68. The lower cone-shaped wall 66 may engage the base dome 27 and the upper cylindrical wall 68 may engage the base shaft 29 of the post base 26. This engagement may provide additional support for the juvenile seat 14 when attached to the attachment post 20.

The juvenile-seat retainer latch 22 is coupled to at least one of the seat shell 60 and the seat-shell pedestal 62 as shown in FIGS. 3 and 6. The juvenile-seat retainer latch 22 protrudes into the post-receiving space 56 in the locked position to engage with the attachment post 20 when the juvenile seat 14 is installed on the seat base 12. The juvenile-seat retainer latch 22 is withdrawn from the attachment-post receiving space 56 in the freed position to allow the juvenile seat 14 to be separated from the seat base 12.

The juvenile-seat retainer latch 22 includes a movable latch 86 and a fixed latch base 88 coupled to at least one of the seat shell 60 and the seat-shell pedestal 62 as shown in FIGS. 8-11. The movable latch 86 is movable relative to the fixed latch base 88 in response to activation of the release actuator 24 to change the retainer latch 22 from the locked position to the freed position. In the locked position, the movable latch 86 is spaced apart from the fixed latch base 88 by a first distance. In the freed position, the movable latch 86 is spaced apart from the fixed latch base 88 by a second distance less than the first distance. In the freed position, the vertical-motion blocking surface of the retainer latch 22 is offset from the attachment post 20.

The release actuator 24 includes a first release handle 70 coupled to a first lateral side 72 of the juvenile seat 14, a second release handle 74 coupled to a second lateral side 76 of the juvenile seat 14, and a latch mover 78 extending between and interconnecting the first and second release handles 70, 74 and the juvenile-seat retainer latch 22. The latch mover 78 includes a first cable 80 interconnecting the first release handle 70 and the juvenile-seat retainer latch 22 and a second cable 82 interconnecting the second release handle 74 and the juvenile-seat retainer latch 22. The first and second release handles 70, 74 are actuatable independently from one another to change the juvenile-seat retainer latch 22 from the locked position to the freed position without actuation of both the first and second release handles 70, 74. The first and second cables 80, 82 are configured to pull the movable latch 86 toward the fixed latch base 86 in response to actuation of at least one of the release handles 70, 74 to change the juvenile-seat retainer latch 22 to the freed position.

In the illustrative embodiment, the child restraint 10 further includes a juvenile-seat retainer system 40 as shown in FIGS. 3, 7, and 12. The juvenile-seat retainer system 40 includes a seat-base retainer 42 fixed to the seat base 12 and a first juvenile-seat retainer 44 fixed to the juvenile seat 14, and a second juvenile-seat retainer 46 fixed to the juvenile seat 14. The first and second juvenile-seat retainers 44, 46 are spaced apart from the juvenile-seat retainer latch 22 to locate the juvenile-seat retainer latch 22 between the first and second juvenile-seat retainers 44, 46. The first juvenile-seat retainer 44 is configured to interlock with the seat-base retainer 42 to block removal of the juvenile seat 14 from the seat base 12 when the juvenile seat 14 is in the forward-facing orientation. The second juvenile-seat retainer 46 is configured to interlock with the seat-base retainer 42 to block removal of the juvenile seat 14 from the seat base 12 when the juvenile seat 14 is in the rearward-facing orientation.

The first and second juvenile-seat retainers 44, 46 are substantially similar. Accordingly, only first juvenile-seat retainer 44 is described herein, and the disclosure of first juvenile-seat retainer is incorporated by reference for second juvenile-seat retainer 46. First juvenile-seat retainer 44 includes an attachment post 441 coupled to the seat shell 60 and a retainer head 442 coupled to an end of the attachment post 441 and spaced apart from the seat shell 60. The attachment post 441 and the retainer head 442 have a T-shape when viewed from the side as shown in FIG. 12.

The seat base retainer 42 is coupled to a rear end the seat base 12 and includes an upper retainer flange 421 and a lower retainer flange 422 as shown in FIGS. 7 and 12. The upper and lower retainer flanges 421, 422 are spaced apart from one another to provide a gap 43 which receives the attachment post 441 of the juvenile-seat retainer 44 in the forward-facing orientation. The retainer head 442 of the juvenile-seat retainer 44 is arranged to lie beneath and/or behind the upper and lower retainer flanges 421, 422 in the forward-facing orientation to locate a portion of the upper and lower retainer flanges between the retainer head 442 and a seat shell 60 of the juvenile seat 14. A similar arrangement occurs when the second juvenile-seat retainer 46 is interlocked with the seat-base retainer 42.

In some embodiments, the juvenile seat 14 is configured to be installed on the seat base 12 in the sideways orientation. The sideways orientation may be any orientation that positions the first and second juvenile-seat retainers 44, 46 at different circumferential locations than the seat-base retainer 42. The juvenile seat 14 is lowered onto the seat base 12 until the juvenile-seat retainer latch 22 is beneath the retainer tip 28 in the locked position. The juvenile seat 14 may then be rotated about vertical rotation axis 18 to the forward-facing orientation or the rearward-facing orientation. The first juvenile-seat retainer 44 is configured to interlock with the seat-base retainer 42 after the juvenile seat 14 is installed and is rotated from the sideways orientation to the forward-facing orientation. The second juvenile-seat retainer 46 is configured to interlock with the seat-base retainer 42 after the juvenile seat 14 is installed and is rotated from the sideways orientation to the rearward-facing orientation. In some embodiments, the seat-base retainer 40 is configured to block the juvenile seat 14 from being removed from the seat base 12 in the forward-facing orientation and the rearward-facing orientation such that the juvenile seat 14 is not installable or removable from the seat base 12 in the forward-facing orientation or the rearward-facing orientation.

The seat base 12 further includes a circumferential-motion blocker 90 coupled to a front end of the seat base 12 opposite the seat-base retainer 42 as shown in FIGS. 7 and 13. The circumferential-motion blocker 90 is configured to block rotation of the juvenile seat 14 about the vertical rotation axis 18 once the juvenile seat 14 reaches the forward-facing orientation or the rearward-facing orientation. The circumferential-motion blocker 90 includes a first inclined ramp 901 and a second inclined ramp 902 spaced apart from the first inclined ramp 901. The first and second inclined ramps 901, 902 are inclined circumferentially toward one another. A retainer-receiving space 92 is defined circumferentially between the first and second inclined ramps 901, 902. In the forward-facing orientation, the second juvenile-seat retainer 46 is received in the retainer-receiving space 92 to block rotation of the juvenile seat 14 about vertical rotation axis 18. In the rearward-facing orientation, the first juvenile-seat retainer 44 is received in the retainer-receiving space 92.

Both of the ramps 901, 902 are movable by the juvenile-seat retainers 44, 46 as the juvenile seat 14 rotates from the sideways orientation to the forward-facing orientation and the rearward-facing orientation. The ramps 901, 902 are biased upwardly toward the juvenile seat 14 to capture the juvenile-seat retainers 44, 46 once one of the juvenile-seat retainers 44, 46 passes one of the ramps 901, 902. A release handle 94 is coupled to the first and second inclined ramps 901, 902 and may be pulled by a user to withdraw the ramps 901, 902 away from the juvenile-seat retainers 44, 46 so that the juvenile seat 14 is free to rotate about the vertical rotation axis 18. The circumferential-motion blocker 90 may be located at any circumferential location about vertical rotation axis 18.

A child restraint 10 includes a seat base 12 adapted to rest on a vehicle seat and a juvenile seat 14 adapted to mount to the seat base 12 to secure the juvenile seat 14 to the vehicle seat. The seat base 12 includes a juvenile-seat attachment post 20. The juvenile seat 14 is removable from the seat base 12 by actuating a release handle 70, 74 to disengage the juvenile seat 14 from the juvenile-seat attachment post 20.

The juvenile seat 14 includes a juvenile-seat support 62, the release handle 70, 74, and a retainer latch 22 coupled to the release handle 70, 74. The juvenile-seat support 62 is coupled to a bottom surface of the juvenile seat 14 facing toward the attachment post 20. The juvenile seat 14 may include first and second release handles that are coupled to opposite lateral sides of the juvenile seat 14 so that the juvenile seat 14 can be separated from the seat base 12 from either side of the juvenile seat 14. The retainer latch 22 is coupled to the juvenile-seat support 62 and is adapted to engage the attachment post 20 when the juvenile seat 14 is installed on the seat base 12 to block removal of the juvenile seat 14 from the seat base 12. The release handles 70, 74 may be located on other parts of the juvenile seat 14 (i.e. front, rear, or center) or on the seat base 12 in other embodiments.

The juvenile-seat support 62 is formed to include a post-receiving passageway 64 that receives the attachment post 20 when the juvenile seat 14 is installed on the seat base 12. The retainer latch 22 is slidable relative to the juvenile-seat support 62 from a locked position at least partially arranged to lie in the post-receiving passageway 24 to engage the attachment post 20, and a freed position removed from the post-receiving passageway 24 so that the attachment post 20 can be removed from the post-receiving passageway 24. The retainer latch 22 is normally biased (i.e. by a spring) toward the locked position to automatically engage with the attachment post 20 when the juvenile seat 14 is installed on the seat base 12.

The attachment post 20 is fixed to the seat base 12 and extends upwardly toward the juvenile seat 14. The attachment post 20 includes a base 26, a retainer tip 28, and a connector post 30 that extends between the base 26 and the retainer tip 28. The base 26 is fixed to the seat base 12. The retainer tip 28 is configured to engage the retainer latch 22 to block removal of the juvenile seat 14 from the seat base 12. The connector 30 has a smaller diameter than the base 26 and the retainer tip 28 to provide the annular latch-receiving channel 31 between the base 26 and the retainer tip 28.

The retainer latch 22 has a thickness that is about equal to a thickness of the annular latch-receiving channel 31. The retainer latch 22 is sized to fit in the annular latch-receiving channel 31 in the locked position such that upward movement of the juvenile seat 14 relative to the seat base 12 causes the retainer latch 22 to engage a lip 38 of the retainer tip 28 to block separation of the juvenile seat 14. Each release handle 70, 74 is coupled to the retainer latch 22 by a cable 80, 82 or another connection member. Actuation of one of the release handles 70, 74 pulls the retainer latch 22 away from the attachment post 20 to remove the retainer latch 22 from the annular latch-receiving channel 31 and to place the retainer latch 22 in the freed position.

The juvenile seat 14 can be mounted on the seat base 12 in a sideways facing orientation, for example, and then rotated to a forward-facing orientation or a rearward-facing orientation. In the forward-facing and rearward-facing orientations, juvenile-seat flanges 44, 46 coupled to the juvenile seat 14 overlap and interlock with a seat-base flange 40 coupled to the seat base 12 to aid the attachment post 20 and retainer latch 22 in retaining the juvenile seat 14 to the seat base 12. In some embodiments, the juvenile seat 14 can only be installed and removed from the seat base 12 in the sideways facing orientation.

The following numbered clauses are contemplated and non-limiting:

Clause 1. A child restraint includes a seat base adapted to rest on a vehicle seat, the seat base including a seat-base foundation and a juvenile-seat attachment post coupled to the seat-base foundation.

Clause 2. The child restraint of clause 1, any other clause, or any suitable combination of clauses, further including a juvenile seat adapted to mount to the seat base to secure the juvenile seat to the vehicle seat, the juvenile seat including a juvenile-seat support, a release handle, and a retainer latch coupled to the juvenile-seat support, Clause 3. The child restraint of clause 2, any other clause, or any suitable combination of clauses, wherein the retainer latch is movable from a locked position, in which the retainer latch is normally biased into engagement with the attachment post when the juvenile seat is installed on the seat base, and a freed position in which the release handle pulls the retainer latch away from the attachment post so that the juvenile seat is separable from the seat base.

Clause 4. The child restraint of clause 2, any other clause, or any suitable combination of clauses, wherein the attachment post includes a base fixed to the seat-base foundation, a retainer tip configured to engage the retainer latch to block removal of the juvenile seat from the seat base, and a connector post that extends between the base and the retainer tip.

Clause 5. The child restraint of clause 3, any other clause, or any suitable combination of clauses, wherein the connector has a smaller diameter than the base and the retainer tip such that a groove is defined between the base and the retainer tip.

Clause 6. The child restraint of clause 5, any other clause, or any suitable combination of clauses, wherein the retainer latch has a thickness that is about equal to a thickness of the groove and the retainer latch is sized to fit in the groove in the locked position such that upward movement of the juvenile seat relative to the seat base causes the retainer latch to engage a lip of the retainer tip to block separation of the juvenile seat.

The invention claimed is:

1. A child restraint comprising
a seat base adapted to rest on a vehicle seat,
a juvenile seat coupled to the seat base, and
a juvenile-seat release system configured to mount the juvenile seat to the seat base and allow separation of the juvenile seat from the seat base,
wherein the juvenile-seat release system includes an attachment post coupled to the seat base and arranged to extend upwardly in a vertical direction away from the seat base, a juvenile-seat retainer latch coupled to the juvenile seat and configured to engage the attachment post to retain the juvenile seat to the seat base, and a release actuator coupled to the juvenile seat and configured to be actuated by a user to change the juvenile-seat retainer latch from a locked position, in which the juvenile-seat retainer latch engages the attachment post, and a freed position, in which the juvenile-seat retainer latch is disengaged from the attachment post to allow separation of the juvenile seat from the seat base,
wherein the attachment post includes a post base coupled to the seat base, a retainer tip spaced apart from the post base, and a latch connector interconnecting the post base and the retainer tip,
wherein the juvenile-seat retainer latch is configured to engage with at least one of the retainer tip and the latch connector and to lie vertically between the post base and the retainer tip in the locked position, and
wherein the retainer tip has a downwardly-sloped upper surface that engages the juvenile-seat retainer latch during installation of the juvenile seat on the seat base to cause movement of the juvenile-seat retainer latch without actuating the release actuator.

2. The child restraint of claim 1, wherein the juvenile-seat retainer latch includes a lower, upwardly-sloped surface that engages the downwardly-sloped upper surface of the retainer tip during installation of the juvenile seat on the seat base and a vertical-motion blocking upper surface that engages a downwardly-facing surface of the retainer tip in the locked position.

3. The child restraint of claim 1, wherein the latch connector has a smaller diameter than the post base and the retainer tip to provide an annular latch-receiving channel below the retainer tip and above the post base and which receives the juvenile-seat retainer latch in the locked position to block separation of the juvenile seat from the seat base.

4. The child restraint of claim 3, wherein the juvenile-seat retainer latch has a thickness that is about equal to a thickness of the annular latch-receiving channel.

5. The child restraint of claim 1, further comprising a juvenile-seat retainer system including a seat-base retainer fixed to the seat base and a juvenile-seat retainer fixed to the juvenile seat and spaced apart from the juvenile-seat retainer latch, the juvenile-seat retainer is configured to interlock with the seat base retainer to block removal of the juvenile seat from the seat base.

6. The child restraint of claim 5, wherein the juvenile seat is rotatable about a vertical rotation axis from a sideways orientation to a forward-facing orientation and the juvenile seat is configured to be installed on the seat base in sideways orientation.

7. The child restraint of claim 6, wherein the juvenile-seat retainer interlocks with the seat-base retainer when the juvenile seat is rotated from the sideways orientation to the forward-facing orientation.

8. The child restraint of claim 6, wherein the seat-base retainer blocks the juvenile seat from being removed from the seat base in the forward-facing orientation such that the juvenile seat is not installable or removable from the seat base in the forward-facing orientation.

9. The child restraint of claim 1, wherein the seat base includes a circular-shaped upper rim and a seat-base foundation that extends downwardly from the upper rim and cooperates with the upper rim to at least partially define a juvenile-seat receiving space.

10. The child restraint of claim 9, wherein the juvenile seat includes a seat shell and a seat-shell pedestal coupled to a bottom of the seat shell and that extends toward the seat-base foundation.

11. The child restraint of claim 10, wherein the seat-base foundation is formed to include a pedestal-receiving space and the seat-shell pedestal is configured to extend into the pedestal-receiving space when the juvenile seat is installed on the seat base.

12. The child restraint of claim 11, wherein the attachment post is arranged to lie at least partially in the pedestal receiving space and the seat-shell pedestal is formed to include a post-receiving space that receives the attachment post when the juvenile seat is installed on the seat base.

13. A child restraint comprising
a seat base adapted to rest on a vehicle seat,
a juvenile seat coupled to the seat base,
a juvenile-seat release system configured to mount the juvenile seat to the seat base and allow separation of the juvenile seat from the seat base, the juvenile-seat release system includes an attachment post coupled to the seat base and arranged to extend upwardly in a vertical direction away from the seat base, a juvenile-seat retainer latch coupled to the juvenile seat and configured to engage the attachment post to retain the juvenile seat to the seat base, and a release actuator coupled to the juvenile seat and configured to be actuated by a user to change the juvenile-seat retainer latch from a locked position, in which the juvenile-seat retainer latch engages the attachment post, and a freed position, in which the juvenile-seat retainer latch is disengaged from the attachment post to allow separation of the juvenile seat from the seat base, and
a juvenile-seat retainer system including a seat-base retainer fixed to the seat base and a juvenile-seat retainer fixed to the juvenile seat and spaced apart from the juvenile-seat retainer latch, the juvenile-seat retainer is configured to interlock with the seat base retainer to block removal of the juvenile seat from the seat base,
wherein the juvenile seat is rotatable about a vertical rotation axis from a sideways orientation to a forward-facing orientation and the juvenile seat is configured to be installed on the seat base in sideways orientation,
wherein the seat-base retainer blocks the juvenile seat from being removed from the seat base in the forward-facing orientation such that the juvenile seat is not installable or removable from the seat base in the forward-facing orientation, and
wherein the juvenile-seat retainer system further includes a second juvenile-seat retainer fixed to the juvenile seat and spaced apart from the juvenile-seat retainer latch and the juvenile-seat retainer and configured to interlock with the seat base retainer when the juvenile seat is in a rearward-facing orientation to block removal of the juvenile seat from the seat base in the rearward-facing orientation.

14. A child restraint comprising
a seat base adapted to rest on a vehicle seat,
a juvenile seat coupled to the seat base, and
a juvenile-seat release system configured to mount the juvenile seat to the seat base and allow separation of the juvenile seat from the seat base,
wherein the juvenile-seat release system includes an attachment post coupled to the seat base and arranged to extend upwardly in a vertical direction away from the seat base, a juvenile-seat retainer latch coupled to the juvenile seat and configured to engage the attachment post to retain the juvenile seat to the seat base, and a release actuator coupled to the juvenile seat and configured to be actuated by a user to change the juvenile-seat retainer latch from a locked position, in which the juvenile-seat retainer latch engages the attachment post, and a freed position, in which the juvenile-seat retainer latch is disengaged from the attachment post to allow separation of the juvenile seat from the seat base,
wherein the seat base includes a circular-shaped upper rim and a seat-base foundation that extends downwardly from the upper rim and cooperates with the upper rim to at least partially define a juvenile-seat receiving space,
wherein the juvenile seat includes a seat shell and a seat-shell pedestal coupled to a bottom of the seat shell and that extends toward the seat-base foundation,
wherein the seat-base foundation is formed to include a pedestal-receiving space and the seat-shell pedestal is configured to extend into the pedestal-receiving space when the juvenile seat is installed on the seat base,
wherein the attachment post is arranged to lie at least partially in the pedestal receiving space and the seat-shell pedestal is formed to include a post-receiving space that receives the attachment post when the juvenile seat is installed on the seat base, and
wherein the juvenile-seat retainer latch is coupled to the seat-shell pedestal and protrudes into the post-receiving space in the locked position and is removed from the post-receiving space in the freed position.

15. A child restraint comprising
a seat base adapted to rest on a vehicle seat,
a juvenile seat coupled to the seat base, and
a juvenile-seat release system configured to mount the juvenile seat to the seat base and allow separation of the juvenile seat from the seat base,
wherein the juvenile-seat release system includes an attachment post coupled to the seat base and arranged to extend upwardly in a vertical direction away from the seat base, a juvenile-seat retainer latch coupled to the juvenile seat and configured to engage the attachment post to retain the juvenile seat to the seat base, and a release actuator coupled to the juvenile seat and configured to be actuated by a user to change the juvenile-seat retainer latch from a locked position, in which the juvenile-seat retainer latch engages the attachment post, and a freed position, in which the juvenile-seat retainer latch is disengaged from the attachment post to allow separation of the juvenile seat from the seat base,
wherein the release actuator includes a first release handle coupled to a first lateral side of the juvenile seat, a second release actuator coupled to a second lateral side of the juvenile seat, and a latch mover extending between and interconnecting the first and second release handles and the juvenile-seat retainer latch.

16. The child restraint of claim 15, wherein the latch mover includes a first cable interconnecting the first release handle and the juvenile-seat retainer latch and a second cable interconnecting the second release handle and the juvenile-seat retainer latch.

17. The child restraint of claim 15, wherein first and second release handles are actuatable independently from one another to change the juvenile-seat retainer latch from the locked position to the freed position without actuation of both the first and second release handles.

* * * * *